United States Patent [19]

Scheffel

[11] 4,087,972
[45] May 9, 1978

[54] BRAKE BOOSTER WITH SPRING TYPE RATIO CHANGER

[75] Inventor: Gary W. Scheffel, Kent, Ohio

[73] Assignee: The Weatherhead Company, Cleveland, Ohio

[21] Appl. No.: 710,690

[22] Filed: Aug. 2, 1976

[51] Int. Cl.² .............................................. B60T 13/12
[52] U.S. Cl. ....................................... 60/548; 60/553; 60/550; 91/391 R; 91/413
[58] Field of Search ................. 60/553, 548, 550, 582, 60/547, 593, 552, 592; 137/625.68; 91/413, 370, 371, 372, 373, 391 R

[56] References Cited

U.S. PATENT DOCUMENTS

| 2,517,005 | 8/1950 | MacDuff | 60/548 |
|---|---|---|---|
| 2,844,941 | 7/1958 | Ayers, Jr. | 60/548 |
| 3,050,944 | 8/1962 | Schwartz | 60/553 |
| 3,119,235 | 1/1964 | Lewis | 137/625.68 |
| 3,712,057 | 1/1973 | Aiki | 60/547 |
| 3,751,919 | 8/1973 | Ron | 60/553 |
| 3,774,635 | 11/1973 | Farrell | 137/625.68 |
| 3,946,564 | 3/1976 | Nakagawa | 60/548 |

Primary Examiner—Martin P. Schwadron
Assistant Examiner—Abraham Hershkovitz
Attorney, Agent, or Firm—McNenny, Pearne, Gordon, Gail, Dickinson & Schiller

[57] ABSTRACT

A motor vehicle fluid power circuit is provided with a constant displacement pump, a control valve, an open center steering valve, and a brake booster with a spring type ratio changer. The brake booster includes an input rod which is connected to a brake pedal of the vehicle and an output rod which is connected to the brake master cylinder of the vehicle. One predetermined ratio of input rod movement to output rod movement is established under normal operating conditions, and a one-to-one ratio is established under emergency conditions when sufficient pressure from the pump is not available for the brake booster.

5 Claims, 1 Drawing Figure

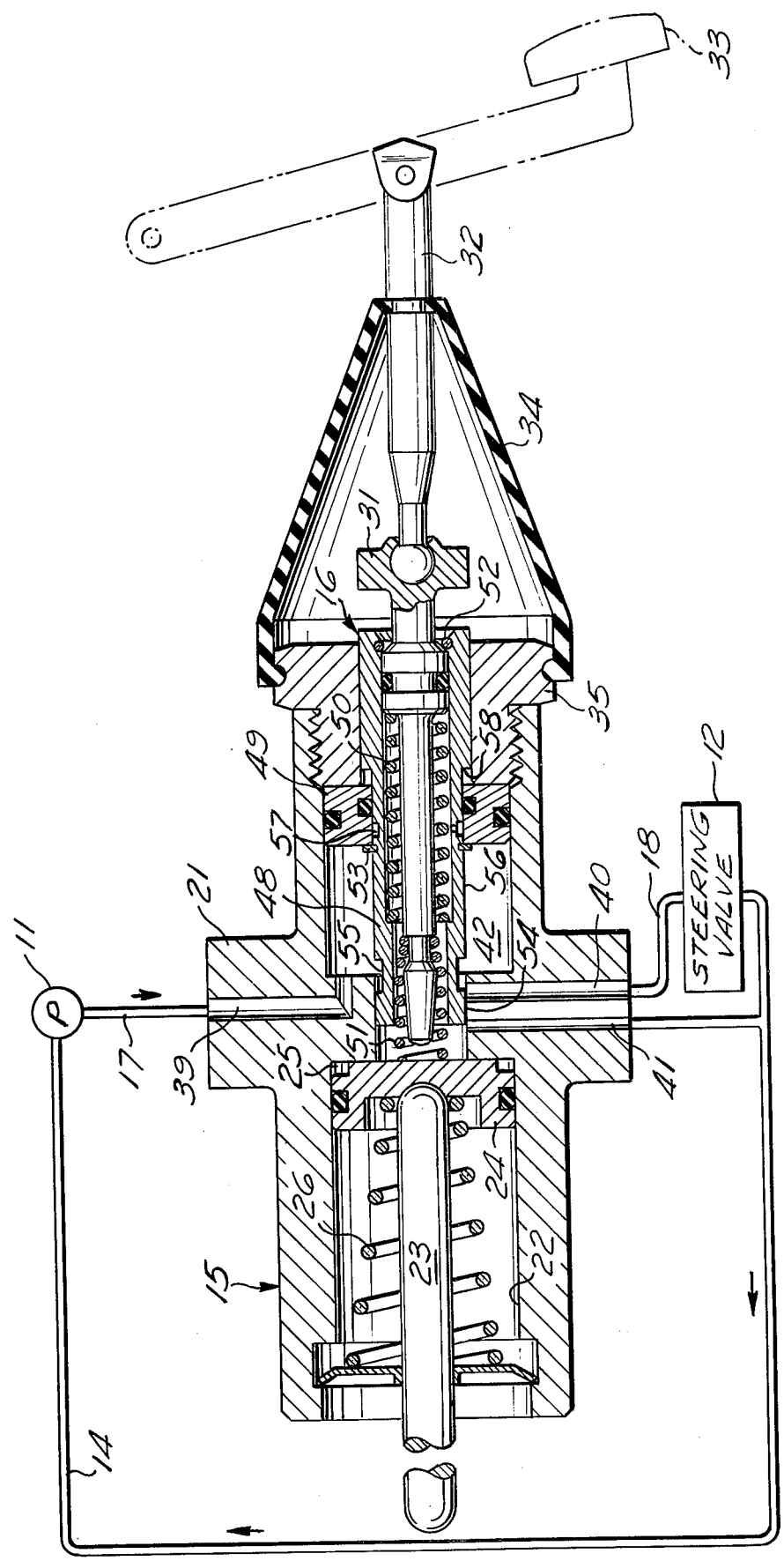

BRAKE BOOSTER WITH SPRING TYPE RATIO CHANGER

BACKGROUND OF THE INVENTION

This invention relates to a motor vehicle hydraulic fluid power circuit having a hydraulic pump for supplying fluid pressure to assist the operator in steering and braking the vehicle.

Motor vehicles are frequently provided with a hydraulic pump which is driven by the engine of the vehicle to provide a source of fluid power. In passenger cars, this source of fluid power may be used in a fluid power circuit to assist the operator in steering the vehicle and to assist the operator in braking the vehicle.

In such motor vehicle fluid power circuits, it is also desirable to provide one ratio of brake pedal movement to master cylinder movement under normal operating conditions and to provide a different ratio in the event of fluid pressure failure in the system. This is desirable because one such ratio will provide the brake pedal movement and brake pedal feel characteristics to which drivers are now accustomed with vacuum actuated braking systems, while a different ratio is required to provide high braking pressures with low pedal effort in the event of pump failure.

In order to provide one ratio of brake pedal movement to master cylinder movement during normal operating conditions and a second ratio in the event of pump failure, both mechanical and hydraulic ratio change devices have been proposed. The mechanical ratio change brake boosters include those which use lever type ratio changers such as shown in U.S. Pat. Nos. 3,733,966 and 3,733,968. Mechanical ratio change brake boosters also include spring type ratio changers such as shown in U.S. Pat. Nos. 3,714,869 and 3,751,919.

SUMMARY OF THE INVENTION

The present invention provides an improvement for brake boosters with spring type ratio changers which (a) prevents excessive brake pedal travel during a spike brake application and also during a gradual brake application when the pump relief pressure is reached, (b) provides a control spool and ratio spring and valving arrangement which minimizes the overall length of the booster and improves the valving characteristics of the brake booster, and (c) provides an input rod and control spool arrangement which permits the pedal return spring to position the control spool in both longitudinal directions in the booster.

BRIEF DESCRIPTION OF THE DRAWING

These and other features and advantages of the present invention will be more readily apparent to those skilled in the art upon an understanding of the invention shown in the accompanying drawing, which illustrates a motor vehicle fluid power circuit according to the principles of the invention with the brake booster and control valve shown in cross section and with the circuit shown at least partially schematically to simplify the description and to assist in understanding the invention.

DETAILED DESCRIPTION OF THE DRAWING

Referring now to the drawing in greater detail, a motor vehicle fluid power circuit is shown which inclues a constant displacement pump 11 which is driven by the engine of the motor vehicle (not shown). In the preferred embodiment the pump 11 is a constant displacement pump having an output of 2.5 gallons per minute and is of the typ commonly used in passenger car power steering systems at the present time.

The circuit shown in the drawing also includes a steering valve 12 which is of the type conventionally used in passenger cars at the present time. The steering valve 12 is an open center valve which directs the fluid which it receives back to the pump 11 through a return line 14 when the steering valve 12 is in its neutral or center position. When fluid from the pump 11 is required to assist in the steering of the vehicle and steering valve 12 is displaced from its center position, the steering valve 12 directs at least some of the fluid received from the pump 11 to assist the operator in steering the vehicle in a well known manner.

The circuit shown in the drawing also includes a brake booster 15 and a control valve 16. A suitable hydraulic line 17 hydraulically connects the outlet side of the pump 11 to the control valve 16 and brake booster 15. Another suitable hydraulic line 18 supplies hydraulic fluid to the inlet side of the steering valve 12.

The brake booster 15 includes a cast iron housing 21 having a cylindrical bore 22 extending from end-to-end therethrough. An output rod or master cylinder actuating rod 23 extends axially through a larger diameter portion of the bore 22 and transmits forces between a cylindrical power piston 24 and a conventional brake master cylinder (not shown) to actuate and deactuate the hydraulic brakes of the vehicle. The power piston 24 and the larger diameter portion of the bore 22 cooperatively define a power chamber 25. The power chamber 25 receives pressurized fluid from the pump 11, and the pressurized fluid exerts a hydraulic force against the power piston 24 to move the power piston 24 to the left when the brakes of the vehicle are to be actuated in a manner described below. A return spring 26 biases the power piston 24 to the right as viewed in the drawing to return the power piston 24 to the position shown in the drawing when the brakes of the vehicle are deactuated.

A one piece input rod 31 is slidably disposed in the right end of the bore 22 in axially aligned relation with the power piston 24. The right end of the input rod 31 is connected to an actuating rod 32 which transmits force between a brake pedal 33 which is operated by the foot of the vehicle operator and the input rod 31. The right end of the input rod 31 is exposed to a pressure inside a dust cover 34 which is substantially equal to atmospheric pressure. The left end of the input rod 31 is exposed to fluid pressure in the power chamber 25 under all conditions, so that the pressure in the power chamber 25 acts against the input rod 31.

As shown in the drawing, the bore 22 includes an enlarged diameter left end portion in which the piston 24 is disposed, a larger diameter right end portion which is closed by a plug 35, and a smaller diameter connecting portion extending between the left and right larger diameter portions. As further shown in the drawing, the housing 21 also includes an inlet passage 39 which receives the entire output from the pump 11 and which is in open fluid communication with a pump chamber 42 in the larger diameter right portion of the bore 22. The housing 21 also includes a steering valve passage 40 which is in valved fluid communication with the pump chamber 42 as discussed further below and a power chamber drain passage 41 which is in valved fluid communication with the power chamber 25 in a manner further discussed below. Both the steering valve passage 40 and the power chamber drain passage 41 extend from the reduced diameter connecting portion of the bore 22, with the power chamber drain passage 41 arranged adjacent the enlarged diameter left bore portion in which the power piston 24 is disposed and with the steering valve passage 40 arranged adjacent the pump chamber 42.

The control valve 16 includes a control spool 48, an annular pedal control sleeve 49, and a ratio spring 50. When the brake pedal 33 is in its deactuated position shown in the drawing, a preloaded pedal return spring 51 urges the input rod 31 to the right against a first snap ring 52 or abutment surface on the control spool 48 and urges a second snap ring 53 or abutment surface on the control spool 48 against the sleeve 49. By this arrangement, the single pedal return spring 51 holds the brake pedal 33 in its deactuated position and prevents movement of the control spool 48 in either direction from its deactuated position shown in the drawing. In this deactuated position, a land 54 at the left most end of the control spool 48 is received in the smaller diameter connecting portion of the bore 22 between the passages 40 and 41 to hydraulically isolate the power chamber 25 from the pump chamber 42 and to establish open fluid pressure communication between the power chamber 25 and the drain passage 41. A first annular groove 55 adjacent the land 54 establishes open fluid pressure communication between the pump chamber 42 and the steering valve passage 40 to permit flow of fluid from the pump 11 through the inlet passage 39 and through the passage 40 to the steering valve 12.

With the spool 48 in the deactuated position, a second land 56 cooperates with the interior cylindrical surface of the sleeve 49 to further prevent fluid communication between the pump pressure in the pump chamber 42 and the power chamber 25. A second groove 57 is provided adjacent the second land 56, and a suitable radial passage extends from the second groove 57 to the hollow interior of the spool 48 so that fluid may flow from the pump chamber 42 through the groove 57 and its associated radial passage into the power chamber 25 when the brake pedal 33 is actuated as described below.

As further shown in the drawing, the annular pedal control sleeve 49 is slidably disposed on the exterior surface of the spool 48 and carries an internal seal which seals against the spool 48 and an external seal which seals the larger diameter right portion of the bore 22. In this manner, the leftward facing annular cross sectional area of the sleeve 49 is exposed to pressure of the pump 11 through the passage 39 under all conditions, and the rightward facing annular area of the sleeve 49 is exposed to the pressure within the dust cover 34 (which is substantially equal to atmospheric pressure as discussed above) through the clearance between the plug 35 and the right end of the spool 48. A leftward facing annular abutment shoulder 58 on the spool 48 is arranged in a predetermined position of spaced adjacency relative to the rightward facing end of the sleeve 49 so that the abutment shoulder 58 engages the sleeve 49 in the event the spool 48 moves more than a predetermined distance to the left from its deactuated position shown in the drawing, as explained below.

The ratio spring 50 is disposed externally of the input rod 31 and internally of the control spool 48. The input rod 31 and the control valve 48 include suitable spaced apart abutment shoulders for engaging and compressing the ratio spring 50 when the brake pedal 33 is actuated. The distance between the spring abutment shoulders of the input rod 31 and control valve 48 is greater than the free height of the ratio spring 50, so that there is no preload on the ratio spring 50 when the brake pedal is deactuated. In the preferred embodiment, the ratio spring 50 has an approximately ⅜ inches travel from its free height to its fully comprssed position and has a spring rate of approximately 160 pounds per inch.

Turning now to the operation of the circuit shown in the drawing when the steering valve 12 is in its neutral or center position so that there is substantially unrestricted fluid flow from the line 18 to the drain line 14, initial actuation of the brake pedal 33 is resisted by the brake pedal return spring 51. The brake pedal return spring 51 has a preload of approximately 12 pounds, so that a relatively light brake pedal effort will overcome the force of the return spring 51 and permit the input rod 31 to be moved to the left.

Upon this initial leftward movement of the input rod 31, the ratio spring 50 acting between the input rod 31 and the control spool 48 begins to move the control spol 48 to the left. During this movement of the control spool 48, the sleeve 49 remains in its at rest position shown in the drawing. During this initial movement of the contrl spool 48, the first land 54 blocks the passage 41 to hydraulically isolate the power chamber 25 from the drain passage 41. This initial movement of the control spool 48 to the left also causes the left side of the second land 56 adjacent the first groove 55 to restrict fluid flow from the inlet passage 39 to the steering valve passage 40 to increase the pressure from the pump 11 in the pump chamber 42. This initial leftward movement of the control spool 48 also causes the right end portion of the second land 56 adjacent the second groove 57 to open fluid communication between the pump chamber 42 and the power chamber 25. The pressure admitted to the power chamber 25 in this manner acts on the power piston 24 to urge the power piston 24 to the left. This pressure admitted to the power chamber 25 also acts to the right on the net lateral cross-sectional area of the control spool 48 exposed to the power chamber pressure (approximately one eighth square inch in the described embodiment) to balance the force of the ratio spring 50 against the control spool 48 and acts on the net lateral cross-sectional area of the input rod 31 exposed to the power chamber pressure to provide a reaction force on the brake pedal 33.

As the brake pedal 33 is pushed to the left with an increasing force to further compress the ratio spring 50, the increased force is transmitted through the ratio spring 50 to the control spool 48. This increased force urges the control spool 48 to the left to further restrict flow from the inlet passage 39 through the groove 55 to the outlet passage 40 to further increase pump pressure in the pump chamber 42. This increased pressure is communicated to the power chamber 25 by the groove 57. As the pressure in the power chamber 25 continues to increase, the power chamber pressure acting against the net lateral cross-sectional area of the control spool 48 exposed thereto urges the control spool 48 to the right so that the position of the control spool 48 in the bore 22 is determined by the force of the partially compressed ratio spring 50 acting to the left and by the pressure of the fluid in the power chamber 25 acting to the right. The control speed 48 moves to the left or to the right as required to balance these forces, and during this portion of the operation of the circuit the abutment shoulder 58 of the control spool 48 does not move far enough to the left to engage the pedal control sleeve 49 and the pedal control sleeve 49 remains stationary.

Because, as described above, the ratio spring 50 has a spring rate of approximately 160 pounds per inch in the described embodiment and has a ⅜ inch travel from its free height to its compressed height, a force of approximately 60 pounds acting to the right on the spring 50 by the control spool 48 and to the left on the spring 50 by the input rod 31 will fully compress the spring 50. In the embodiment shown in the drawing, the control spool 48 and input rod 31 are arranged such that this occurs when a pressure of approximately 400 to 500 pounds per square inch is provided in the power chamber 25. When the ratio spring 50 is fully compressed and the force acting to the left on the input rod 31 is further increased by the operator exerting a greater force on the brake pedal 33, the input rod 31 does not move significantly farther to the left. Instead, the input rod 31 and control spool 48 move together as a unit a relatively small amount to restrict the flow of fluid through the groove 55 to provide a sufficiently high pressure in the power chamber 25 to act against the net lateral cross-sectional areas of the control spool 48 and input rod 31 exposed to the power chamber pressure to balance the increased force exerted on the input rod 31. Under these operating conditions after the ratio spring 50 is fully compressed, the ratio between brake pedal force and power chamber pressure will be the same as when the ratio spring 50 is not compressed, with the only difference in the operation being that further substantial movement to the left of the brake pedal 33 and input rod 31 will no longer occur after the ratio spring 50 is fully compressed.

When the force on the input rod 31 acting to the left is decreased by the operator decreasing the force on the brake pedal 33, the power chamber pressure acting on the control spool 48 and input rod 31 urges the control spool 48 to the right. This opens communication from the power chamber 25 to the drain passage 41 to decrease the pressure in the power chamber 25 and permits the power piston 24 to move to the right to decrease the force exerted on the brake master cylinder of the vehicle (not shown). When the force on the brake pedal 33 is fully released, the return spring 26 returns the power piston 24 to the position shown in the drawing, while the pedal return spring 51 returns the input rod 31 and control spool 48 to the positions shown in the drawing.

From the above description of the operation of the brake booster 15 and the control valve 16 when the steering valve 12 is deactuated, it is apparent that the first land 54 closes the drain passage 41 and that throttling of fluid flow occurs at the left end of the second land 56 adjacent the first groove 55 to increase the pump pressure. Again, it is pointed out that during this portion of the operation of the circuit, the pedal control sleeve 49 remains stationary in the position shown in the drawing.

When the brake booster 15 is deactuated and the steering valve 12 is actuated for a steering maneuver, the steering valve 12 restricts flow of fuid from the line 18 to the drain line 14 and increases the pressure from the pump 11 through the inlet passage 39 and the pump chamber 42 and the steering valve passage 40. This increased pressure in the pump chamber 42, when the brake booster is deactuated, is isolated from the power chamber 25 by the right end of the second land 56 adjacent the groove 57. When the steering valve is actuated in this manner to provide a higher pump outlet pressure than is required by the brake booster power chamber 25 and the brake booster is subsequently actuated, the first land 54 covers the drain passage 41 and the right end of the second land 56 adjacent the groove 57 throttles fluid from the pump chamber 42 to the power chamber 25 until the pressure in the power chamber 25 is sufficient to balance the force exerted by the input rod 31. Thus, when the steering valve 12 is actuated to produce a sufficient restriction to cause the pressure in the pump chamber 42 to increase above the pressure required by the power chamber 25, fluid from the pump chamber 42 is throttled at the right edge of the second land 56 to provide the necessary reduced power chamber. Again, it is noted during this operation of the circuit shown in the drawing, the pedal control sleeve 49 remains stationary.

Having explained the operation of the circuit shown in the drawing when the pedal control sleeve 49 is nonoperative (that is, when the pedal control sleeve 49 does not affect operation of the control spool 48 or the input rod 31), the purpose and operation of the pedal control sleeve 49 will now be explained. The pedal control sleeve 49 is functional during two modes of operation of the circuit shown in the drawing.

The first mode of operation in which the pedal control sleeve 49 is functional is during a spike brake application in which the operator of the vehicle suddenly depresses the brake pedal 33 to the left with an unusually high force. Under these conditions, the input rod 31 moves very rapidly to the left and transmits a force through the ratio spring 50 to the control spool 48 which moves the control spool 48 very rapidly to the left also. When this occurs, the left edge of the second land 56 may severely restrict flow of fluid from the passage 39 through the groove 55 to the passage 40, causing a very rapid increase in pressure in the outlet of the pump 11. This excessive movement of the control spool 48 to the left under a spike brake application causes the abutment shoulder 58 of the control spool 48 to engage the pedal control sleeve 49. The rapid increase in pressure in the pump chamber 42 acts against the leftwardly facing end of the pedal control sleeve 49 and prevents substantial movement of the pedal control sleeve 49 to the left. If the pedal control spool 49 is moved to the left a small amount under these conditions, the rapidly increasing pressure in the pump chamber 42 acts against the pedal control sleeve 49 and pushes it to the right back to the position shown in the drawing in which the pedal control sleeve 49 engages the plug 35. Because of the large net lateral cross-sectional area of the pedal control sleeve 49 exposed to pump pressure in the pump chamber 42 (approximately one square inch in the preferred embodiment), the pedal control sleeve 49 prevents excessive brake pedal travel in the event of a spike brake application and limits the movement of the control spool 48 to the left to prevent the control spool 48 from completely terminating flow of fluid from the passage 39 to the passage 40. Because the ratio spring 50 has a travel of only approximately three-eighth inch in the preferred embodiment, this limiting of the leftward movement of the control spool 48 also limits the leftward movement of the input rod 31 and thereby prevents excessive travel of the brake pedal 33 under these conditions of a spike brake application.

The second condition under which the pedal control sleeve 49 functions to prevent excessive travel of the brake pedal 33 occurs when the relief pressure of the pump 11 is reached during a gradual increase in the force applied to the input rod 31 by the brake pedal 33. As described above, the control spool 48 is balanced in the bore 22 by a force acting to the left transmitted through the ratio spring 50 and by a force acting to the right created by the pressure in the power chamber 25. When the pressure in the power chamber 25 under severe braking conditions reaches the relief pressure of the pump 11, the internal relief valve of the pump 11 opens so that the outlet pressure from the pump 11 cannot increase further. When this occurs, and the operator of the vehicle exerts a still greater force on the brake pedal 33 to create a still greater force on the input rod 31 to the left, such increased force acting to the left on the control spool 48 cannot be balanced by an increased pressure acting to the right on the control spool 48 because the pressure cannot increase any further. When this occur, the annular abutment shoulder 58 of the control spool 48 engages the pedal control sleeve 49. Because of the large lateral cross-sectional area of the pedal control sleeve 49 exposed to the pump relief pressure in the pump chamber 42 (a pump relief pressure of 1,200 pounds per square inch acting against a one square inch lateral cross-sectional area of the pedal control sleeve 49 creates a force of approximately 1,200 pounds acting to the right on the pedal control sleeve 49), the control spool 48 and input rod 31 cannot move any further to the left in the bore 22 after the annular abutment shoulder 58 engages the pedal control sleeve 49. Thus, by this arrangement the pedal control sleeve 49 prevents excessive travel to the left of the control sleeve 48 and input rod 31 and brake pedal 33 when the pump relief pressure is reached under gradual braking conditions.

In the event of a fluid pressure failure in the system so that fluid pressure from the pressure 11 in the pump chamber 42 is not available to enter the power chamber 25 and move the power piston 24 to the left, a one-to-one ratio of input rod movement to power piston movement is maintained by the brake booster 15. In this event, movement of the input rod 31 and control spool 48 to the left is not resisted by fluid pressure in the power chamber 25, and the input rod 31 moves to the left until it engages the power piston 24. During this portion of the operation of the circuit, the abutment shoulder 58 of the control spool 48 engages the pedal control sleeve 49 so that the pedal control sleeve 49 also moves to the left with the control spool 48 and the input rod 31. The force exerted on the input rod 31 by the brake pedal 33 is then transmitted directly to the power piston 24, and the input rod 31 pushes the power piston 24 to the left to actuate the brake master cylinder of the vehicle (not shown).

What is claimed is:

1. In a motor vehicle, a fluid power circuit comprising a pump having an inlet side and an outlet side, a control valve, a steering valve having an inlet side and an outlet side, a brake booster, and conduit means hydraulically connecting said pump and control valve and steering valve and brake booster; said brake booster including a housing having a bore extending therethrough, said bore having a first end portion and a second end portion and a connecting portion between said end portions, said end portions each having a significantly larger diameter than said connecting portion, a power piston slidably disposed in said first end portion of said bore, a power chamber in said first end portion of said bore on one side of said power piston, an input rod slidably disposed in said second end portion of said bore on said one side of said power piston and having a first end and a second end, a brake pedal operatively connected to said first end of said input rod for axially moving said input rod in said bore between a deactuated position and an actuated position, a pump passage in said housing hydraulically connected to said pump outlet side and opening into said second end portion of said bore, a steering valve passage in said housing hydraulically connected to said steering valve inlet side and opening into said connecting portion of said bore adjacent said second end portion of said bore, a drain passage in said housing hydraulically connected to said pump inlet side and opening into said connecting portion of said bore adjacent said first end portion of said bore; said control valve including a control spool slidably disposed in said bore on said one side of said power piston and having a first end and a second end, said control spool including an exterior surface, first valving surface means on said exterior surface of said control spool defining a fluid flow path extending from said second end portion of said bore to said steering valve passage in said connecting portion of said bore, second valving surface means on said exterior surface of said control spool axially spaced from said first valving surface means between said first valving surface means and said brake pedal, said first valving surface means controlling fluid flow from said second end portion of said bore to said steering valve passage and said second valving surface means controlling fluid flow from said second end portion of said bore to said power chamber, one of said ends of said control spool being exposed to fluid power chamber pressure and arranged so that fluid power chamber pressure acting on said one end urges said control spool in one direction in said bore, a ratio spring operatively connected to said input rod and to said control valve, said ratio spring being constructed and arranged to urge said control valve in a direction opposite said first direction when said input rod is actuated, and brake pedal travel control means including an annular sleeve slidably disposed in said second portion of said bore operatively associated with said control spool limiting the travel of said control spool and of said input rod and brake pedal to prevent excessive travel of said brake pedal under predetermined operating conditions, and said brake pedal travel control means being inoperative under all other operating conditions, said exterior surface of said control spool including a third valving surface means controlling fluid flow from said power chamber to said drain passage, said control spool including at least two lands each having opposite ends, said third valving surface means being one of said ends of one of said lands, said first and second valving surface means being said opposite ends of the other of said lands, said second valve surface means being disposed within said annular sleeve when said input rod is in said deactuated position.

2. A fluid power circuit as set forth in claim 1, wherein said control spool is a hollow spool having an interior and an exterior, said input rod is at least partially disposed within said interior of said control spool, and said ratio spring is disposed within said interior of said control spool between said input rod and said control spool.

3. A fluid power circuit as set forth in claim 2, said input rod and control spool including axially confronting surfaces which operatively engage one another by operation of said ratio spring when said control spool is in said deactuated position, said confronting surfaces being spaced apart when said input rod is in said actuated position, and a brake pedal return spring operatively connected to said input rod and urging said input rod in a direction away from said power chamber when said input rod is in said deactuated position.

4. In a motor vehicle, a fluid power circuit comprising a pump having an inlet side and an outlet side, a control valve, a steering valve having an inlet side and an outlet side, a brake booster, and conduit means hydraulically connecting said pump and control valve and steering valve and brake booster; said brake booster including a housing having a bore extending therethrough, said bore having a first end portion and a second end portion and a connecting portion between said end portions, said end portions each having a significantly larger diameter than said connecting portion, a power piston slidably disposed in said first end portion of said bore, a power chamber in said first end portion of said bore on one side of said power piston, an input rod slidably disposed in said second end portion of said bore on said one side of said power piston and having a first end and a second end, a brake pedal operatively connected to said first end of said input rod for axially moving said input rod in said bore between a deactuated position and an actuated position, a pump passage in said housing hydraulically connected to said pump outlet side and opening into said second end portion of said bore, a steering valve passage in said housing hydraulically connected to said steering valve inlet side and opening into said connecting portion of said bore adjacent said second end portion of said bore, a drain passage in said housing hydraulically connected to said pump inlet side and opening into said connecting portion of said bore adjacent said first end portion of said bore; said control valve including a control spool slidably disposed in said second end portion and said connecting portion of said bore on said one side of said power piston and having a first end and a second end, said control spool including an exterior surface, first valving surface means on said exterior surface of said control spool defining a fluid flow path extending from said second end portion of said bore to said steering valve passage in said connecting portion of said bore, second valving surface means on said exterior surface of said control spool axially spaced from said first valving surface means between said first valving surface means and said brake pedal, said first valving surface means controlling fluid flow from said second end portion of said bore to said steering valve passage and said second valving surface means controlling fluid flow from said second end portion of said bore to said power chamber, one of said ends of said control spool being exposed to fluid power chamber pressure and arranged so that fluid power chamber pressure acting on said one end urges said control spool away from said power chamber in one direction in said bore, a ratio spring operatively connected to said input rod and to said control valve and acting therebetween, said ratio spring being constructed and arranged to urge said control valve in a direction opposite said first direction when said input rod is actuated, brake pedal travel control means in said second end portion of said bore operatively associated with said control spool limiting the travel of said control spool and of said input rod and brake pedal to prevent excessive travel of said brake pedal under predetermined operating conditions, said brake pedal travel control means being inoperative under all other operating conditions, said brake pedal travel control means including an annular sleeve slidably disposed in said second end portion of said bore on said control spool, and said pump passage establishing open fluid pressure communication between said pump outlet side and said annular sleeve under all operating conditions, said control spool including third valving surface means disposed in said connecting portion of said bore controlling fluid flow from said power chamber to said drain passage, and said control spool including at least two lands each having opposite ends, said third valving surface means being one of said ends of one of said lands, and said first and second valving surface means being said opposite ends of the other of said lands, said second valving surface means being disposed within said annular sleeve when said input rod is in said deactivated position.

5. A fluid power circuit as set forth in claim 4, wherein said control spool includes an axially facing abutment surface disposed in confronting spaced apart relation with said annular sleeve under all other operating conditions, said abutment surface operatively engaging said annular sleeve under said predetermined operating conditions.

* * * * *